United States Patent [19]
Deane

[11] 3,917,017
[45] Nov. 4, 1975

[54] BATTERY OPERATED VEHICLE DRIVE
[75] Inventor: Clifford T. Deane, South Charleston, W. Va.
[73] Assignee: West Virginia High Bird Corporation(Entire), St. Albans, W. Va.
[22] Filed: Dec. 9, 1974
[21] Appl. No.: 531,102

Related U.S. Application Data
[63] Continuation-in-part of Ser. No. 436,683, Jan. 25, 1974, Pat. No. 3,874,472.

[52] U.S. Cl.................. 180/65 R; 290/16; 318/139; 320/8
[51] Int. Cl.²......................................... B60L 11/12
[58] Field of Search........ 180/65 R, 65 F, 65 A, 60; 318/139; 320/61, 8, 7, 6; 290/16

[56] References Cited
UNITED STATES PATENTS
| | | | |
|---|---|---|---|
| 1,095,967 | 5/1914 | Lister | 180/65 R X |
| 3,241,019 | 3/1966 | Gross | 180/65 R |
| 3,300,698 | 1/1967 | Bopp et al. | 318/139 |
| 3,616,782 | 11/1971 | Taylor | 180/65 R |

FOREIGN PATENTS OR APPLICATIONS
| | | | |
|---|---|---|---|
| 17,526 | 1907 | United Kingdom | 290/11 |

*Primary Examiner*—David Schonberg
*Assistant Examiner*—Milton L. Smith
*Attorney, Agent, or Firm*—Clarence A. O'Brien; Harvey B. Jacobson

[57] ABSTRACT

Two banks of series-connected batteries are alternately charged by an engine driven generator under control of a change-over selector. While one bank of batteries is being charged the other bank powers a drive motor for vehicle propulsion at a speed controlled by selection of power terminals in each battery bank, at different voltage levels, from which the drive motor is energized.

12 Claims, 2 Drawing Figures

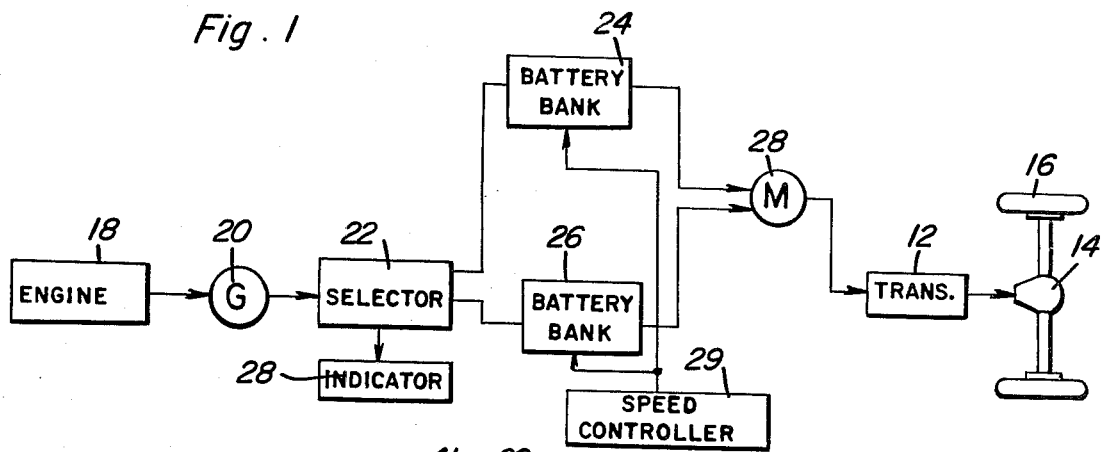
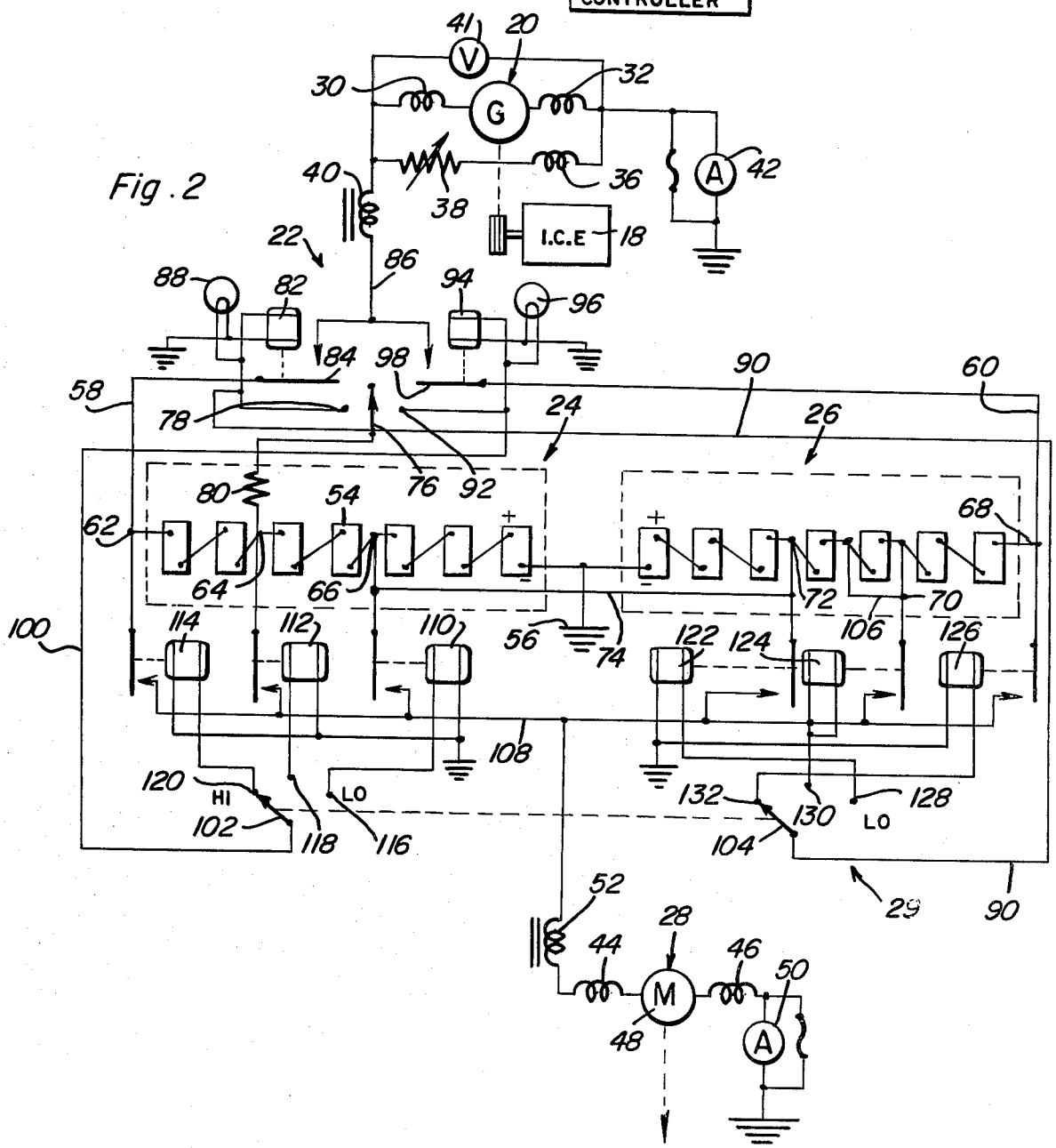

BATTERY OPERATED VEHICLE DRIVE

This invention relates to battery powered drives for automotive vehicles and is an improvement over the power driven system disclosed and claimed in my prior copending application, Ser. No. 436,683, filed Jan. 25, 1974, now U.S. Pat. No. 3,874,472, of which the present application is a continuation-in-part.

Battery powered electric drive motors for propelling automotive vehicles are well known including arrangements in which there are two banks of storage batteries, one bank being charged by a gasoline engine driven generator while the other bank powers the drive motor. Generally, in such systems speed control is exercised through the drive motor circuit which involves a considerable loss of energy and results in discharge of the batteries at too rapid a rate requiring frequent changeover between the battery banks. As can be appreciated, the operating life of the batteries without external recharge is adversely affected by the foregoing problem as well as the general efficiency of the power plant and the fuel economy of the engine driving the generator. It is therefore an important object of the present invention to reduce energy losses associated with battery powered drive motor systems of the aforementioned type so as to prolong the operating range of the vehicle without external recharge and/or replacement of batteries.

In accordance with the present invention, drive motor speed is controlled by selectively connecting the drive motor to one of a plurality of power terminals at different voltage levels associated with each bank of series-connected batteries. By means of a selector component, power is drawn at a selected voltage terminal from one bank of batteries while an engine driven generator is connected to the highest voltage terminal of the other bank of batteries for rapid charging thereof. In this fashion, both battery charging and discharging operations are performed without energy losing compromises and motor circuit losses from speed control is eliminated.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a schematic block diagram depicting the power generating and supply system of the present invention.

FIG. 2 is an electrical circuit diagram corresponding to the system depicted in FIG. 1.

Referring now to the drawings in detail, FIG. 1 illustrates schematically a power generating and supply system or power plant generally referred to by reference numeral 10 adapted to propel a vehicle within which it is installed. Thus, in the example shown, power is fed to the input of a vehicle transmission 12, the output of which is drivingly connected through a differential 14 to the powered propelling wheels 16 of the vehicle.

The vehicle power plant includes a relatively small fuel combustion engine 18, such as a 10 horsepower internal combustion engine drivingly connected to an electrical generator 20, such as a 400 ampere, D.C. generator. The electrical output of the generator is operative through a change-over selector component 22 to alternately charge banks of batteries 24 and 26. The battery bank charged at any time is identified by indicator means 28 to which the selector component is connected. While one of the battery banks is being charged, the other is being discharged by supplying power to an electric drive motor 28, such as a 4 horsepower, D.C. series traction motor. The output of the drive motor is drivingly connected to the vehicle transmission 12. The supply of power from the battery banks to the drive motor is controlled by a speed controller 29.

With reference to FIG. 2, the engine driven generator 20 includes a pair of stator coils 30 and 32 connected in series with the armature and a parallel connected field coil 36 connected in series with an adjustable resistor 38. This arrangement is particularly suitable for battery charging purposes of the present invention. The output of the generator is coupled through the selector component 22 to one of the battery banks, in series with an inductive reactor 40 to form a battery charging circuit. The reactor 40 is operative to dampen current surges during the charging cycle and absorbs excess current to prevent heating of and to minimize boiling in the batteries. The charging condition of the generator may be monitored by a fused ammeter 42 connected between the generator output and ground while the output is monitored by voltmeter 41.

The battery powered drive motor 28 includes field coils 44 and 46 connected in series with its armature 48. One terminal of the motor is connected to ground through a fused ammeter 50 through which operation of the motor may be monitored. The power input terminal of the drive motor is connected to one of the battery banks through a saturable, inductive reactor 52. Reactor 52 is operative to cushion heavy current surges resulting from rapid starting and/or rapid switching of the speed controller 29.

Each of the battery banks 24 and 26 includes seven battery units 54 interconnected in series. The battery units may be of a commercially available, 6-volt storage battery type having positive and negative terminals at opposite ends as shown. The batteries 54 are interconnected in series between a common ground 56 and a high voltage line 58 for battery bank 24 or a high voltage line 60 for battery bank 26. The high voltage line 58 is therefore connected to the highest energy level or voltage terminal 62 of battery bank 24, which also is provided with an intermediate voltage terminal 64 and a lowest voltage terminal 66. Similarly, the other battery bank 26 is provided with high, intermediate and low voltage terminals 68, 70 and 72. In the illustrated embodiment, the low voltage terminals 66 and 72 are at a potential of 18 volts above ground while the intermediate voltage terminals 64 and 70 and the high voltage terminals 62 and 68 are at potentials of 30 volts and 42 volts, respectively. To accommodate high power starting of the drive motor at 18 volts, the low voltage terminals 66 and 72 are connected by a jumper cable 74 to interconnect three of the series-connected batteries 54 of each of the battery banks, in parallel. Thus, power is drawn from both battery banks for low speed starting of the drive motor. At higher speeds, power is drawn from only selected ones of the battery banks at the intermediate or high voltage terminal thereof.

One of the battery banks is selected for charging by the generator through the selector component 22 by means of a selector switch 76 displaceable from its neutral position shown to either one of its operative positions, either manually or automatically as disclosed in my prior copending application. In one operative position, switch 76 engages contact 78 to connect intermediate voltage terminal 64 of battery bank 24 through resistor 80 to relay 82. Relay 82 is thereby energized at 28 volts to close its normally open relay switch 84 connecting the generator output line 86 from reactor 40 to the high voltage terminal 62 of battery bank 24 through high voltage line 58. Indicator lamp 88, connected in parallel with relay 82, is illuminated at the same time to identify battery bank 24 as being charged. The 28 volts supplied through selector switch 76 to relay 82 and indicator lamp 88 is also supplied through conductor 90 to the speed controller 29 through which a selected voltage terminal of battery bank 26 is connected to the drive motor for energization thereof.

When the selector switch 76 is displaced to its other operative position engaging contact 92, relay 94 and indicator lamp 96 are energized to close relay switch 98 and signify charging of battery bank 26 through high voltage line 60. Operating voltage for the speed controller 29 is then supplied from selector switch 76 through conductor 100 in order to connect the battery bank 24 to the drive motor while battery bank 26 is being charged.

The speed controller 29 includes ganged speed selecting switches 102 and 104 respectively connected to conductors 100 and 90 through which the operating current is supplied from the intermediate terminal 64 of battery bank 24 through resistor 80. In order to match the lowering of the voltage at terminal 64 of battery bank 24, resulting from the supply of operating current to the speed controller 29 and selector component 22, a jumper 106 interconnects intermediate terminal 70 of battery bank 26 with the next lower voltage terminal of the bank. The voltage terminals 62, 64 and 66 of battery bank 24 are respectively connected to a common power supply line 108 upon closing of corresponding relay switches associated with speed control relays 110, 112 and 114. The speed control relays are respectively energized by operating current conducted thereto from speed selecting switch 102 through low, intermediate and high switch contacts 116, 118 and 120. Operating current at the other speed selecting switch 104, energizes another set of speed control relays 122, 124 and 126 through switch contacts 128, 130 and 132 in order to connect one of the voltage terminals 72, 70 and 68 to the common power supply line 108. Thus, by positioning of the ganged switches 102 and 104, the operating voltage level for the drive motor 28 may be changed in order to correspondingly vary the speed of the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle having a fuel combustion engine, a drive propelling transmission, a drive motor connected to the transmission for propelling the vehicle, a generator driven by the engine, at least two energy storing battery assemblies each having a plurality of power terminals at different energy levels, a charging circuit connected to the generator for storing energy developed by the generator in the battery assemblies, selector means connected to the charging circuit for selecting one of the battery assemblies within which said energy is stored, and speed controlling means connecting the drive motor to a selected one of the power terminals in the other of the battery assemblies for energizing the drive motor with energy stored at a corresponding one of the energy levels.

2. The combination of claim 1 wherein each of the battery assemblies includes a plurality of battery units interconnected in series between said power terminals.

3. The combination of claim 2 including inductive reactor means connected in series with the generator and the drive motor for respectively absorbing excess energy supplied to the battery assemblies being charged and energy surges to the drive motor resulting from switching in the speed controlling means.

4. The combination of claim 3 wherein said selector means comprises switch means interconnecting the generator with those power terminals of the battery assemblies at the highest energy levels, and switch operating means connected to one of the power terminals of a first of the battery assemblies at a lower energy level for actuating the switch means.

5. The combination of claim 4 wherein said speed controlling means includes relay means for respectively connecting the selected one of the power terminals to the drive motor and speed selecting means connected to said one of the power terminals of said first of the battery assemblies for energizing the relay means.

6. The combination of claim 2 wherein said selector means comprises switch means interconnecting the generator with those power terminals of the battery assemblies at the highest energy levels, and switch operating means connected to one of the power terminals of a first of the battery assemblies at a lower energy level for actuating the switch means.

7. The combination of claim 6 including means interconnecting two of the battery units in the second of the battery assemblies in parallel to compensate for current drawn from the first of the battery assemblies by the switch operating means.

8. The combination of claim 2 wherein said speed controlling means includes relay means for respectively connecting the selected one of the power terminals to the drive motor and speed selecting means connected to one of the battery assemblies for energizing the relay means.

9. The combination of claim 1 including inductive reactor means connected in series with the generator and the drive motor for respectively absorbing excess energy supplied to the battery assemblies being charged and energy surges to the drive motor resulting from switching in the speed controlling means.

10. The combination of claim 1 wherein said speed controlling means includes relay means for respectively connecting the selected one of the power terminals to the drive motor and speed selecting means connected to one of the battery assemblies for energizing the relay means.

11. The combination of claim 2 including jumper means interconnecting the power terminals of the battery assemblies at the lowest of the energy levels for energizing the drive motor by parallel connected battery units at the lowest of the energy levels.

12. The combination of claim 1 wherein said selector means comprises switch means interconnecting the generator with those power terminals of the battery assemblies at the highest energy levels, and switch operating means connected to one of the power terminals of a first of the battery assemblies at a lower energy level for actuating the switch means.

* * * * *